March 8, 1960  J. STETSON  2,927,599
SEWER CONNECTOR FOR ROTATING BUILDING
Filed Nov. 30, 1956  2 Sheets-Sheet 1

John Stetson
INVENTOR.

BY *[signatures]*
Attorneys

March 8, 1960   J. STETSON   2,927,599
SEWER CONNECTOR FOR ROTATING BUILDING
Filed Nov. 30, 1956   2 Sheets-Sheet 2

John Stetson
INVENTOR.

2,927,599
Patented Mar. 8, 1960

2,927,599
SEWER CONNECTOR FOR ROTATING BUILDING

John Stetson, Palm Beach, Fla.

Application November 30, 1956, Serial No. 625,523

6 Claims. (Cl. 137—247)

This invention relates to rotating buildings and more particularly to sewer connections which are adapted to be used in connection therewith.

An object of the present invention is to provide a fluid collecting system to receive fluid from other lines that are in motion while containing the fluid and any gases in connection therewith. The invention enables the joining of one or more lines that may or may not be in motion to one or more fixed collection lines whereby the collection or transfer of liquids or gases under low pressure is achieved. One of the principal uses is collecting of soil and waste through plumbing lines in a building that has a part which rotates or is otherwise in motion with respect to a main sewer line, while containing the gases in the system.

The design utilizes three parallel and adjacent ducts with a heavy oil or other fluid of high viscosity in the outer trenches or ducts and a sliding cover so designed as to ride in this heavy liquid thereby providing the seal to prevent the escape of the gases and eliminating the necessity of machined connections between the fixed and movable parts of the system. This is of high significance inasmuch as the machining of the relatively large parts in a building construction which would be necessary in the absence of the system described herein, would be prohibitive from an economical standpoint.

A further object of the invention is to provide a practical sewage collection and disposing system for a rotating building that is, a building which has a part rotatable in respect to a fixed part, the system involving ordinary risers to service the various floors of the rotating part of the building, the risers being operatively connected to and mechanically joined with a movable cover of circular formation, this movable cover having means which cooperate with a fixed upwardly opening channel to separate the channel into ducts, the innermost duct being adapted to conduct the waste away through the ordinary sewage system of a community while the flanking ducts function as gas seals or traps for the innermost duct.

I am aware of prior rotating buildings which have provision for discharge of sewage. But, all of the prior rotating buildings of which I am aware have used the center core space for this purpose. Inasmuch as the elevator shaft or shafts must be in this fixed center core and other utilities if at all possible, it is far superior in planning to have the sewage collected at a location other than the center, non-rotating core of the building structure. Moreover, the seals necessary to connect plumbing laterals to the non-rotating core are important. Therefore, it is a further object of this invention to provide a more practical system for disposing of sewage in a building wherein there is a movable part and a fixed part with the sewage being collected by practically vertical runs of soil pipe as in the ordinary non-movable building, and without being faced with the problem of connecting the sewage to the non-rotating central core of the building.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a fragmentary perspective view of the assembly of Figure 3.

In the accompanying drawings there is a rotating building 10 which is constructed to exemplify the principles of the invention. The building is made of a structurally fixed central core part 12 and a relatively movable part 14 mounted concentrically thereon. The specific structures involved in these parts are subject to wide variations as to arrangement of rooms, the disposition of various equipments, etc. The building has a movable part and a fixed part and one of the numerous problems to be solved is how to attach the plumbing so as to dispose of the waste in a way which will comply with various State codes thereby being safe and yet, accomplish the purpose without utilizing the more valuable space in the building and without undergoing an immense expense.

Figure 1:
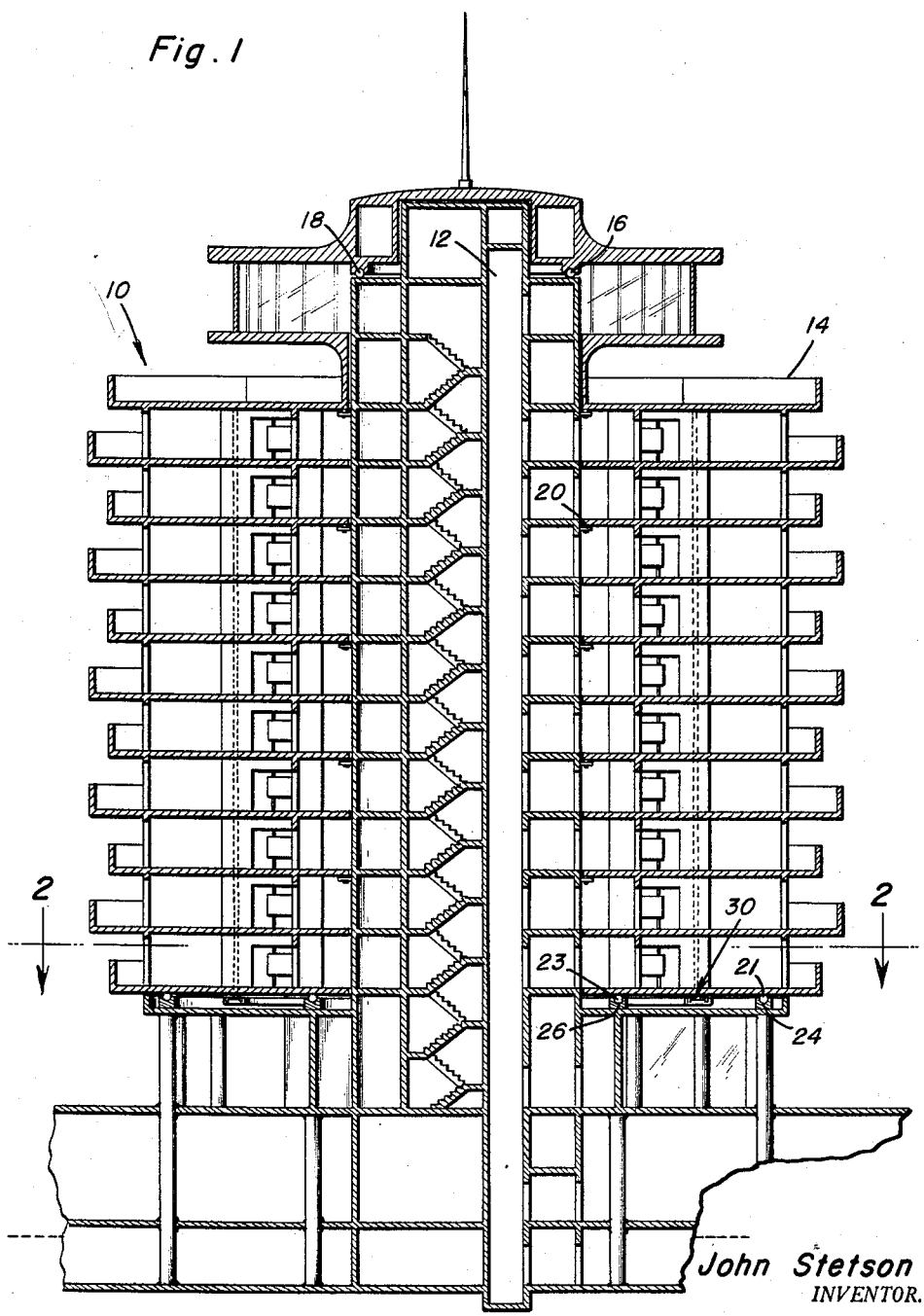
Figure 1 is a longitudinal vertical sectional view of a typical building which is fitted with a sewage system constructed in accordance with the invention.
Figure 2:
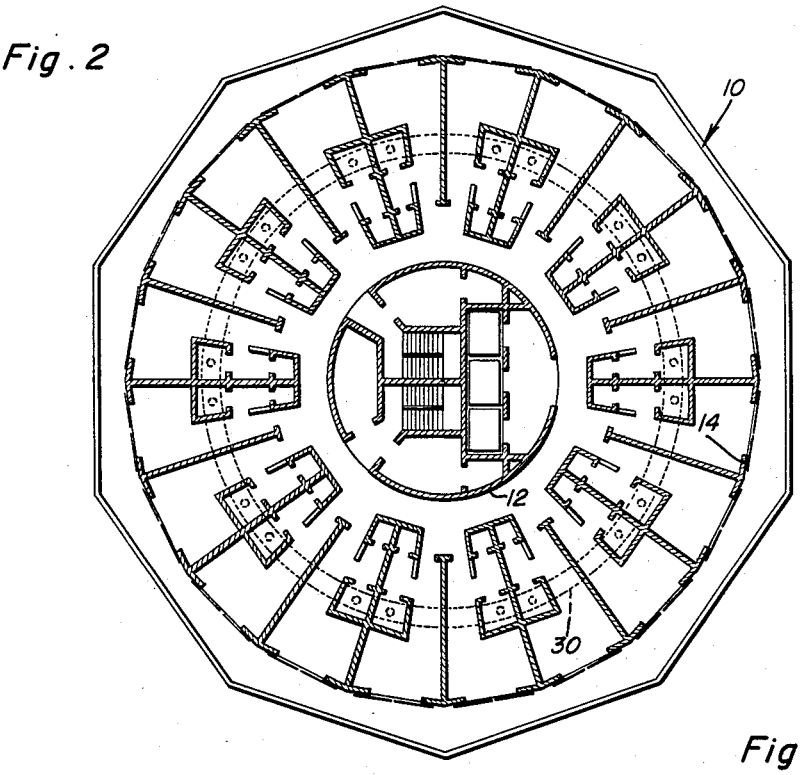
Figure 2 is a transverse sectional view taken on the line 2—2 of Figure 1.
Figure 3:
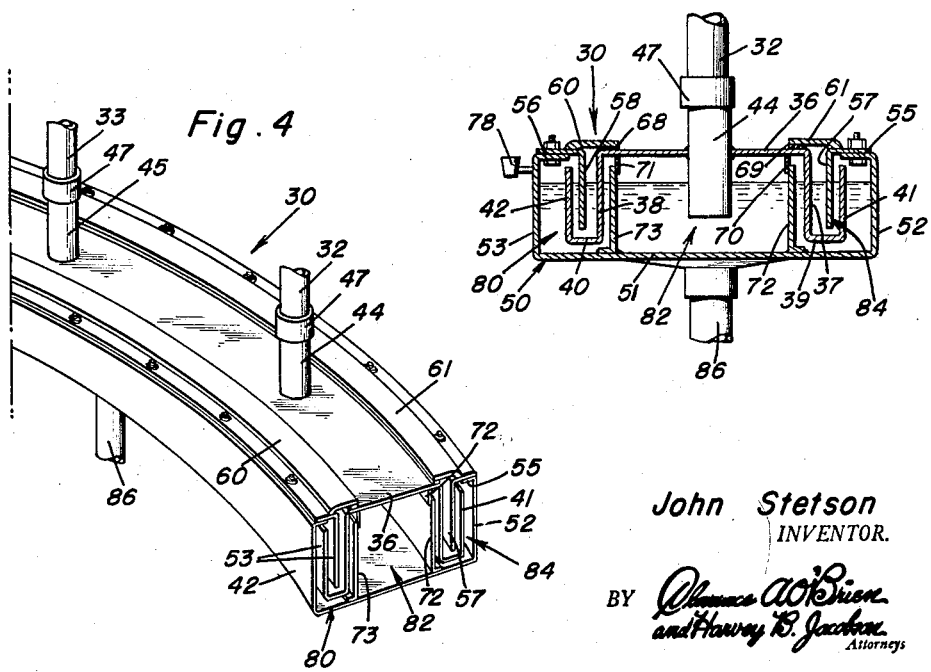
Figure 3 is an enlarged transverse sectional view of the sewage collecting assembly which demonstrates the principles of the invention.

For convenience the ten stories of the rotating part 14 of the building are shown as having their bathroom fixtures and water fountains, approximately vertical although this is certainly not essential for the proper operation of the invention. In a building of this nature adequate provision is made to enable the rotating part to rotate at a slow speed on the fixed core part 12. Therefore upper carriages 16 are mounted on circular tracks 18 at the top of core part 12 while there are wind load tracks 20 at spaced places along the central bore of part 14 and on the fixed part 12 of the building. Concentric carriages 21 and 23 in concentric tracks 24 and 26 support the room and corridor loads above. A convenient location for the assembly 30 (Figures 3 and 4) would be between the tracks 24 and 26 and accordingly, it is so located.

The normal plumbing needs for each floor of the rotating part 14 are satisfied and there are a plurality of soil lines, for example, lines 32 and 33. These soil lines and others like it service the plumbing fixture in the rotating part 14 of the building. Assembly 30 is made of a cover 36 which is preferably flat and circular in formation. The cover has vertical wall members or walls 37 and 38 which are also circular but at right angles to the cover 36. Inner and outer horizontal plates 39 and 40 are joined to the lower edges of the walls 37 and 38 and have walls 41 and 42 at their outer edges which are parallel to the walls 37 and 38 and spaced therefrom by the width of the plates 39 and 40. The walls and plates described immediately preceding form upwardly opening generally U-shaped troughs that are concentric and which are held spaced apart by means of cover 36. Short lengths as at 44 and 45 of soil line are passed through apertures in cover 36 and are welded or otherwise rigidly secured in place. An ordinary bell connection 47 with a poured leaded joint is suggested for attaching the lines 32 and 33 to their short length 45 and 44 of soil line.

Cover 36 and all of the walls attached to it are operatively connected to the upwardly opening channel 50. This channel is made of a bottom wall 51 and a pair of parallel side walls 52 and 53, the bottom and both walls being circular with the walls being in right angles to the plane of the bottom wall 51. Inwardly directed flanges 55 and 56 are at the upper edges of the walls 52 and 53 and they support the parallel, circular baffles 57 and 58, the latter being located in the space between the pairs 37 and 41, and 38 and 42 of walls that have been described previously. Cover plates 60 and 61 are connected, as by being bolted, to the flanges 55 and 56, as are the mounting flanges (unnumbered) for the baffles 57 and 58. A part of the cover plates 60 and 61 overlies cover 36 and there are neoprene or equivalent seals 68 and 69 located between the confronting surfaces of plates 61 and 60 and the cover 36. Additional seals 70 and 71 of the same type are carried by the stationary cover 36 and wipe on surfaces of two walls 72 and 73 which are fixed to the bottom 51 of the channel 50 and which rise upwardly in a concentric, parallel relation to the baffles 57, 58 and the walls 37, 38, 41 and 42.

An oil receiving cup 78 is connected by a small pipe to the wall 53 so as to receive highly viscous oil or some other liquid which is adapted to float on the surface of the liquid within the assembly. As seen from an inspection of Figure 3 the various walls and baffles together with seals 70 and 71 actually separate the assembly into three concentric ducts 80, 82 and 84 with the duct 82 being flanked by the two ducts 80 and 84, the latter ducts being adapted to be covered by oil or some other viscous liquid functioning to aid in the sealing of gases so as to confine them within the assembly.

Inasmuch as cover 36 and all parts rigidly secured to it rotate with part 14 and channel 50 and all parts rigidly connected to it are fixed with respect to the movable part of the building 14, the waste lines 86 attached to the bottom part of the channel 50 may be attached in the customary way to the sewage system in the community.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a sewage collection assembly adapted to be used between two relatively movable structures to prevent the escape of sewage gases, the combination of an upwardly opening circular channel provided with a sewage outlet, a pair of concentric spaced walls in said channel subdividing said channel into a central soil duct and a pair of flanking ducts, a cover mounted on said channel for rotational movement relative to the channel and provided with an inlet adapted to conduct sewage into said soil duct, a pair of spaced concentric wall members depending from said cover and disposed in said flanking ducts, substantially laterally projecting plates protruding from said pair of wall members and located in said pair of flanking ducts, walls spaced from said wall members and said concentric walls and rising from said plates and located in said flanking ducts, a pair of baffles carried by said channel and disposed within said flanking ducts and spaced from and located between said walls members and said walls that rise from said plates to thereby subdivide the flanking ducts, and seals between said cover and said pair of concentric spaced walls in said channel.

2. The combination of claim 1 wherein there are flanges connected with said channel and disposed above portions of said flanking ducts, and cover plates attached to said flanges and extending over the remaining portions of said flanking ducts.

3. The combination of claim 1 wherein said flanking ducts are adapted to accommodate a liquid within which said pair of wall members that depend from said cover are submersed, and means for introducing liquid into said flanking ducts.

4. A seal assembly adapted to be connected between two movable structures, said seal assembly comprising an upwardly opening channel having a bottom wall and a pair of channel walls, said channel being essentially circular and having an outlet, a pair of concentric spaced walls attached to said channel bottom wall and subdividing said channel into three concentric ducts, a first of said ducts located between the second and third ducts, said first duct having said outlet registered therewith, said second and third ducts being traps, a cover disposed over said channel and provided with an inlet which registers with said first duct, said cover and channel being relatively rotationally movable, said cover being spaced from the upper edges of said concentric walls, seals between said cover and said upper edges of said concentric walls to isolate said second and third ducts from said first duct, said second and third ducts adapted to contain a liquid, a pair of spaced wall members depending from said cover and disposed in said second and third ducts and being sufficiently long to penetrate the liquid in said second and third ducts thereby subdividing the space above the liquid level in said second and third ducts, and means also located in said second and third ducts for further subdividing the space above the liquid level in said second and third ducts.

5. A seal assembly adapted to be connected between two movable structures, said seal assembly comprising an upwardly opening channel having a bottom wall and a pair of channel walls, said channel being essentially circular and having an outlet, a pair of concentric spaced walls attached to said channel bottom wall and subdividing said channel into three concentric circular ducts, a first of said ducts located between the second and third ducts, said first duct having said outlet registered therewith, said second and third ducts being traps, a cover disposed over said channel and provided with an inlet which registers with said first duct, said cover and channel being relatively rotationally movable, said cover being spaced from the upper edges of said concentric walls, seals between said cover and said upper edges of said concentric walls to isolate said second and third ducts from said first duct, said second and third ducts adapted to contain a liquid, a pair of spaced wall members depending from said cover and disposed in said second and third ducts and being sufficiently long to penetrate the liquid in said second and third ducts thereby subdividing the space above the liquid level in said second and third ducts, means also located in said second and third ducts for further subdividing the space above the liquid level in said second and third ducts, additional walls in said second and third ducts, and means mounting said additional walls in approximately parallel relationship to the last mentioned space subdividing means.

6. A seal assembly adapted to be connected between two movable structures, said seal assembly comprising an upwardly opening channel having a bottom wall and a pair of channel walls, said channel being essentially circular and having an outlet, a pair of concentric spaced walls attached to said channel bottom wall and subdividing said channel into three concentric circular ducts, a first of said ducts located between the second and third ducts, said first duct having said outlet registered therewith, said second and third ducts being traps, a cover disposed over said channel and provided with an inlet which registers with said first duct, said cover and channel being relatively rotationally movable, said cover being spaced from the upper edges of said concentric walls, seals between said cover and said upper edges of said concentric walls to isolate said second and third ducts from said first duct, said second and third ducts adapted to contain a liquid, a pair of spaced wall members depending from said cover and disposed in said second and third ducts and being sufficiently long to penetrate the liquid in said second and third ducts thereby subdividing the space above the liquid level in said second and third ducts, means also located in said second and third ducts for further subdividing the space above the liquid level in said second and third ducts, additional walls in said second and third ducts, means mounting said additional walls in approximately parallel relationship to the last mentioned space subdividing means, and a cover plate mounted over said second and third ducts and confining said space above the liquid level in said second and third ducts.

References Cited in the file of this patent

UNITED STATES PATENTS

| | | |
|---|---|---|
| 725,937 | Craig | Apr. 21, 1903 |
| 1,501,552 | Bergman | July 15, 1924 |
| 1,877,487 | Brooks | Sept. 13, 1932 |
| 2,294,214 | Seinfeld | Aug. 25, 1942 |